United States Patent
Lee

(10) Patent No.: US 7,839,126 B2
(45) Date of Patent: Nov. 23, 2010

(54) SIGNAL CONVERTING APPARATUS AND SIGNAL CONVERSION METHOD PROVIDING ADJUSTED ERROR SIGNAL WITH MODIFIED SWING RANGE

(75) Inventor: Sang Chul Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 271 days.

(21) Appl. No.: 12/122,782

(22) Filed: May 19, 2008

(65) Prior Publication Data

US 2008/0291703 A1 Nov. 27, 2008

(30) Foreign Application Priority Data

May 22, 2007 (KR) ........................ 10-2007-0049753

(51) Int. Cl.
*G05F 1/652* (2006.01)
*G05F 1/656* (2006.01)

(52) U.S. Cl. ...................... 323/222; 323/282; 323/284; 323/285

(58) Field of Classification Search ................. 323/222, 323/282, 284, 285
See application file for complete search history.

(56) References Cited

U.S. PATENT DOCUMENTS

| 6,246,220 | B1 | 6/2001 | Isham et al. | |
|---|---|---|---|---|
| 6,404,175 | B1 * | 6/2002 | Yang et al. | 323/282 |
| RE38,487 | E | 4/2004 | Isham et al. | |
| 6,784,649 | B1 * | 8/2004 | Ohms | 323/284 |
| 6,870,354 | B2 * | 3/2005 | Nishimaki | 323/284 |
| 6,897,636 | B2 * | 5/2005 | Harris | 323/272 |
| RE38,940 | E | 1/2006 | Isham et al. | |
| 7,061,218 | B2 * | 6/2006 | Ito | 323/351 |
| 7,170,272 | B2 * | 1/2007 | Yoshida | 323/284 |
| 7,250,745 | B2 * | 7/2007 | Yasukouchi et al. | 323/284 |
| 7,304,462 | B2 * | 12/2007 | Shvarts | 323/284 |
| 7,319,311 | B2 * | 1/2008 | Nishida | 323/284 |
| 7,482,796 | B2 * | 1/2009 | Nishida | 323/284 |
| 2005/0285579 | A1 * | 12/2005 | Yasukouchi et al. | 323/282 |
| 2007/0057655 | A1 * | 3/2007 | Nishida | 323/282 |

FOREIGN PATENT DOCUMENTS

| JP | 2006148987 | 6/2006 |
|---|---|---|
| JP | 2006187068 | 7/2006 |
| JP | 2006254588 | 9/2006 |
| KR | 1020010030203 A | 4/2001 |
| KR | 1020050123034 A | 12/2005 |

* cited by examiner

*Primary Examiner*—Bao Q Vu
(74) *Attorney, Agent, or Firm*—Volentine & Whitt, PLLC

(57) ABSTRACT

A signal converting apparatus is disclosed and includes a swing range converting unit converting an error signal swinging in a first swing range to an adjusted error signal swinging in a second swing range, an oscillator generating a periodic oscillation signal swinging in approximately the second swing range, and a comparator receiving and comparing the adjusted error signal and the oscillation signal, and generating a pulse-width modulated signal in relation to the comparison.

5 Claims, 5 Drawing Sheets

SIGNAL CONVERTING APPARATUS AND SIGNAL CONVERSION METHOD PROVIDING ADJUSTED ERROR SIGNAL WITH MODIFIED SWING RANGE

CROSS-REFERENCE TO RELATED APPLICATIONS

This application claims priority under 35 U.S.C. §119 to Korean Patent Application No. 10-2007-0049753 filed on May 22, 2007, the subject matter of which is hereby incorporated by reference.

BACKGROUND OF THE INVENTION

1. Field of the Invention

The present invention relates to a signal converting apparatus, and more particularly to a signal conversion apparatus and related conversion method characterized by a fast settling time.

2. Description of the Related Art

Generally speaking, the output of a system having an input/output transfer function will change in relation to changes in an applied input. Within a specified range, the time required for the system output to stabilize following an input change is referred to as "settling time".

Figure (FIG.) 1 is a general block diagram of a conventional signal converting apparatus. Referring to FIG. 1, signal converting apparatus 100 includes a driving unit 110, an oscillator 130 generating a signal having a periodic sawtooth waveform, a switching transistor 131, and an output unit 133.

Driving unit 110 receives an error signal Verr from an error amplifier (not shown). The error signal Verr swings within a predetermined range, and in response to the error signal Verr driving unit 110 outputs a pulse-width modulated signal to switching transistor 131 when the received error signal Verr remains within its swing range, as defined by the sawtooth waveform provided by oscillator 130 (i.e., between a maximum value and a minimum value for the sawtooth waveform). However, when the error signal Verr exceeds the swing range defined by the sawtooth waveform, driving unit 110 provides a predetermined signal instead of the error signal Verr to switching transistor 131.

Accordingly, switching transistor 131 controls the supply of a predetermined voltage Vo to an inductor L within output unit 133 by being turned ON/OFF in response to the signal provided by driving unit 110. In this manner, driving unit 110 prevents an over-current condition from being applied to switching transistor 131 and the inductor L. However, driving unit 110 exhibits overly long settling times for output voltage Vo applied to output unit 133.

SUMMARY OF THE INVENTION

Embodiments of the invention provide a signal converting apparatus and related method that provide an output signal having relatively faster settling times by reducing the rapid overshoot and undershoot responses of the output voltage.

In one embodiment, the invention provides a signal converting apparatus comprising; a swing range converting unit converting an error signal swinging in a first swing range to an adjusted error signal swinging in a second swing range, an oscillator generating a periodic oscillation signal swinging in approximately the second swing range, and a comparator receiving and comparing the adjusted error signal and the oscillation signal, and generating a pulse-width modulated signal in relation to the comparison.

In another embodiment, the invention provides a signal converting method comprising; converting an error signal swinging in a first swing range to an adjusted error signal swinging in a second swing range, generating a periodic oscillation signal swinging in approximately the second swing range, and receiving and comparing the adjusted error signal and the oscillation signal, and generating a pulse-width modulated signal in relation to the comparison.

DESCRIPTION OF EMBODIMENTS

Figure 1:
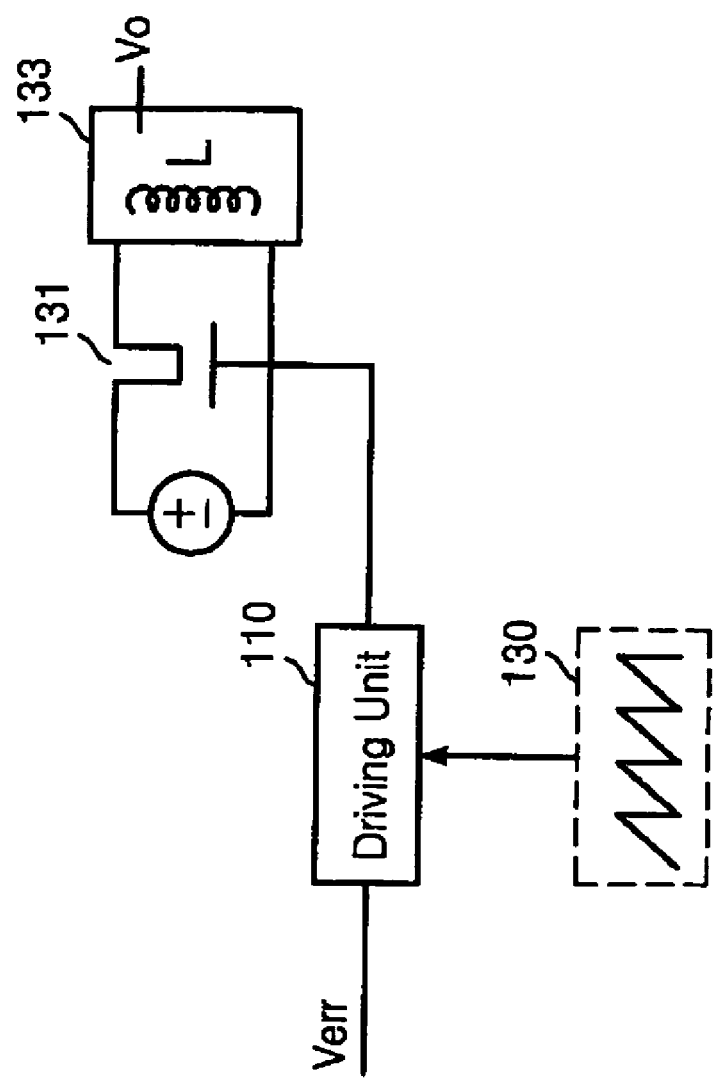
FIG. 1 is a block diagram of a conventional signal converting apparatus.

Embodiments of the invention will now be described with reference to the accompanying drawings. However, the invention may be variously embodied and should not be construed as being limited to only the illustrated embodiments. Throughout the written description and drawings reference numerals refer to like or similar elements.

Figure 2:
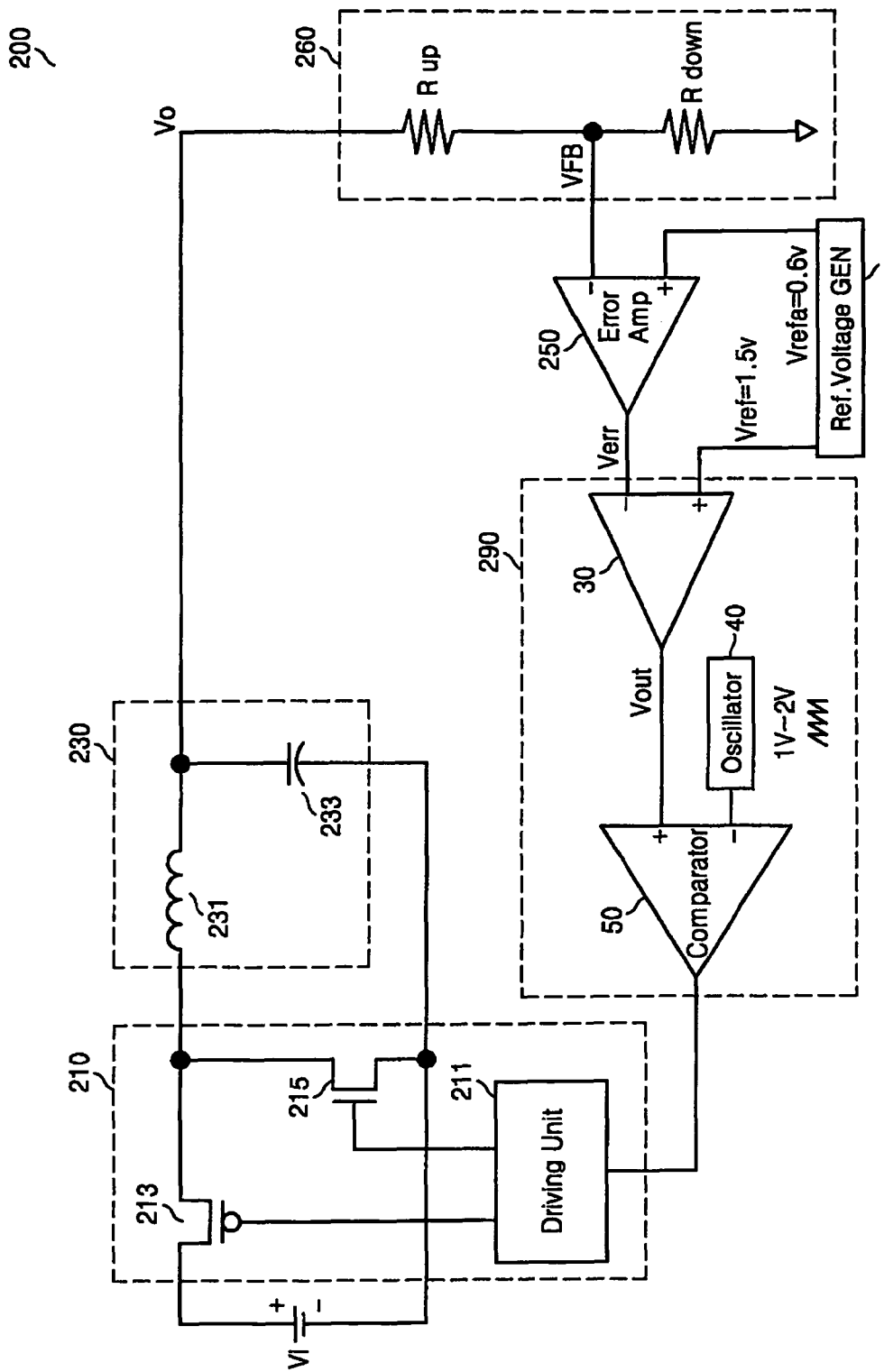
FIG. 2 is a block diagram of a signal converting apparatus according to an embodiment of the invention.

FIG. 2 is a block diagram of a signal converting apparatus according to an embodiment of the invention. Referring to FIG. 2, a signal converting apparatus 200 comprises a switching unit 210 connected to a DC power source Vi, a low pass filter 230, a voltage divider 260, an error amplifier 250, a reference voltage generator 270, and a signal converter 290.

The DC power voltage is applied to an input terminal of low pass filter 230 through switching unit 210 in response to one or more control signals provided by driving unit 211. In the illustrated embodiment, switching unit 210 comprises a PMOS transistor 213 connected between a first terminal, (e.g., a positive (+) terminal) of the DC power source and the input terminal of low pass filter 230, and a NMOS transistor 215 connected between the input terminal of low pass filter 230 and a second terminal, (e.g., a negative (−) terminal) of the DC power source.

PMOS transistor 213 and NMOS transistor 215 are arranged to be turned ON/OFF by turns. Driving unit 211 receives a pulse-width modulated signal received from a comparator 50 in signal converter 290 and generates two control signals applied respectively to the gate of PMOS transistor 213 and the gate of NMOS transistor 215. In other embodiments of the invention, the pulse-width modulated signal provided by comparator 50 may be directly applied to PMOS transistor 213 and NMOS transistor 215.

Low pass filter 230 low-pass filters the voltage output from switching unit 210 and outputs a low-pass filtered voltage Vo. In the illustrated embodiment, low pass filter 230 is implemented using an inductor 231 and a capacitor 233. Accordingly, low pass filter 230 generates a direct current DC voltage Vo from the voltage generated by the switched output of switching unit 210, (i.e., a square wave voltage using properly selected values for inductor 231 and capacitor 233).

Voltage divider 260 divides the output voltage Vo from low pass filter 230 and outputs the divided voltage VFB. For example, voltage divider 260 may include a plurality of resistance Rup and Rdown connected in series between an output terminal of low pass filter 230 and ground. The reference voltage generation unit 270 generates a plurality of reference voltages Vrefa and Vref having different levels. For example, a first reference voltage Vrefa may be 0.6V and a second reference voltage Vref may be 1.5V.

Error amplifier 250 receives the output voltage VFB from voltage divider 260 at a negative (−) input terminal, and the first reference voltage Vrefa at a (+) input terminal, and generates the error signal Verr by amplifying the voltage difference between the voltage divider output voltage VFB and the first reference voltage Vrefa.

In the illustrated embodiment, signal converter 290 comprises a swing range converting unit 30, an oscillator 40, and a comparator 50. Swing range converting unit 30 may be implemented using an operational amplifier and in this configuration is commonly called a post scaler. Swing range converting unit 30 converts the error signal Verr swinging between a first swing range, (e.g., 0.0V~2.8V), to an adjusted error signal Vout swinging between a second swing range, (e.g., 1.0V~2.0V).

Figure 3:
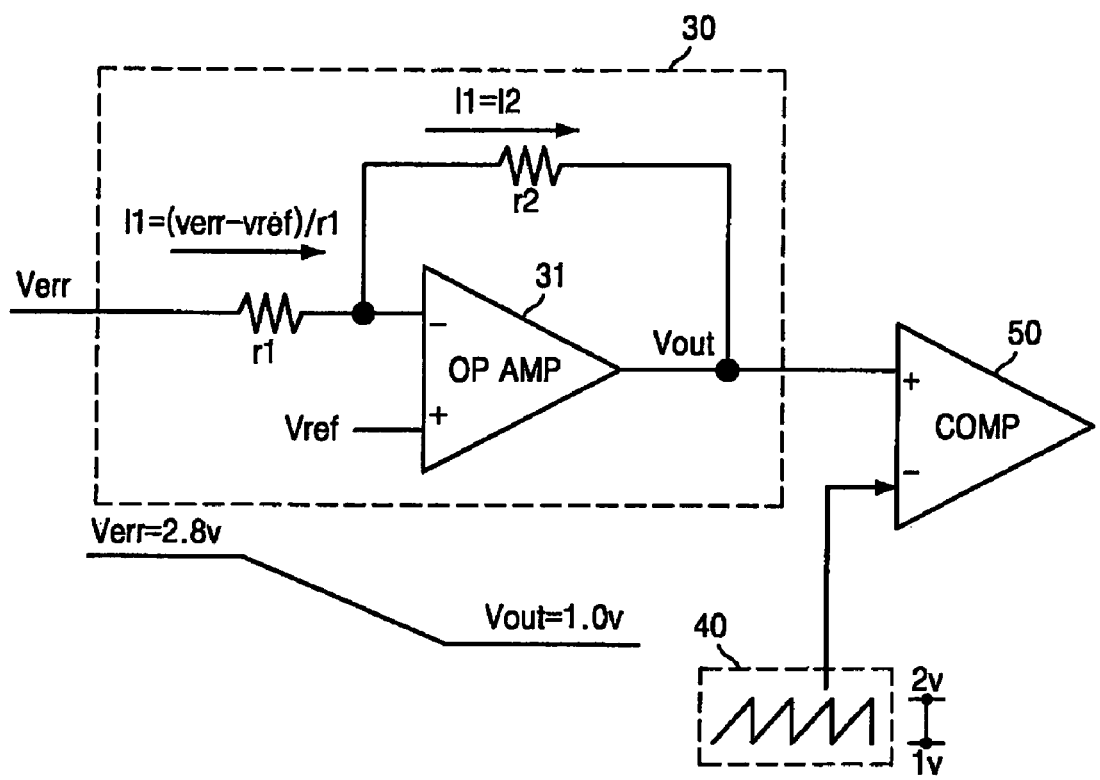
FIG. 3 is a block diagram further illustrating the operation of a swing range for the converting unit when an output signal of an error amplifier is bigger than a reference signal.

One possible embodiment of swing range converting unit 30 is further illustrated in FIG. 3. That is, swing range converting unit 30 comprises a first resistor r1, a second resistor r2, and an operational amplifier 31. Operational amplifier 31 receives the error signal Verr through a negative (−) input terminal via first resistor r1 and the second reference voltage Vref through a positive (+) input terminal. The second resistance r2 is connected between the negative (−) input terminal and an output terminal operational amplifier 31.

Oscillator 40 generates a periodic oscillating signal, (e.g., a sawtooth waveform). Oscillator 40 may be conventionally implemented and will hereafter be assumed, as an example, to generate a sawtooth waveform swinging between 1.0V to 2.0V. Hence, consistent with the foregoing, oscillator 40 generates a sawtooth waveform that defines the second swing range, (e.g., 1.0V~2.0V).

Comparator 50 receives the adjusted error signal Vout swinging in the second swing range, (e.g., 1.0V~2.0V), and the sawtooth waveform provide by oscillator 40, compares them, and generates the pulse-width modulation signal as a result of the comparison.

In one embodiment of the invention, signal converting apparatus 200 may be implemented as a DC to DC converter.

Referring to FIGS. 2, 3, and Equation 1 below, swing range converting unit 30 will convert an error signal Verr of 2.8V to an adjusted error signal Vout of approximately 1.0V (or 1.0125V per equation 1).

$$Verr = 2.8v, \; Vref = 1.5 \qquad \text{Equation 1}$$

$$r1 = 80 \; k$$

$$r2 = 30 \; k$$

$$Vout = Vref - \frac{Verr - Vref}{r1} * r2$$

$$= 1.5 - \frac{2.8 - 1.5}{80 \; k} * 30 \; k$$

$$= 1.0125 \; v$$

$$i1 = (2.8 - 1.5)/80 \; k$$

$$= 16.25 \; uA$$

$$i1 = i2$$

Figure 4:
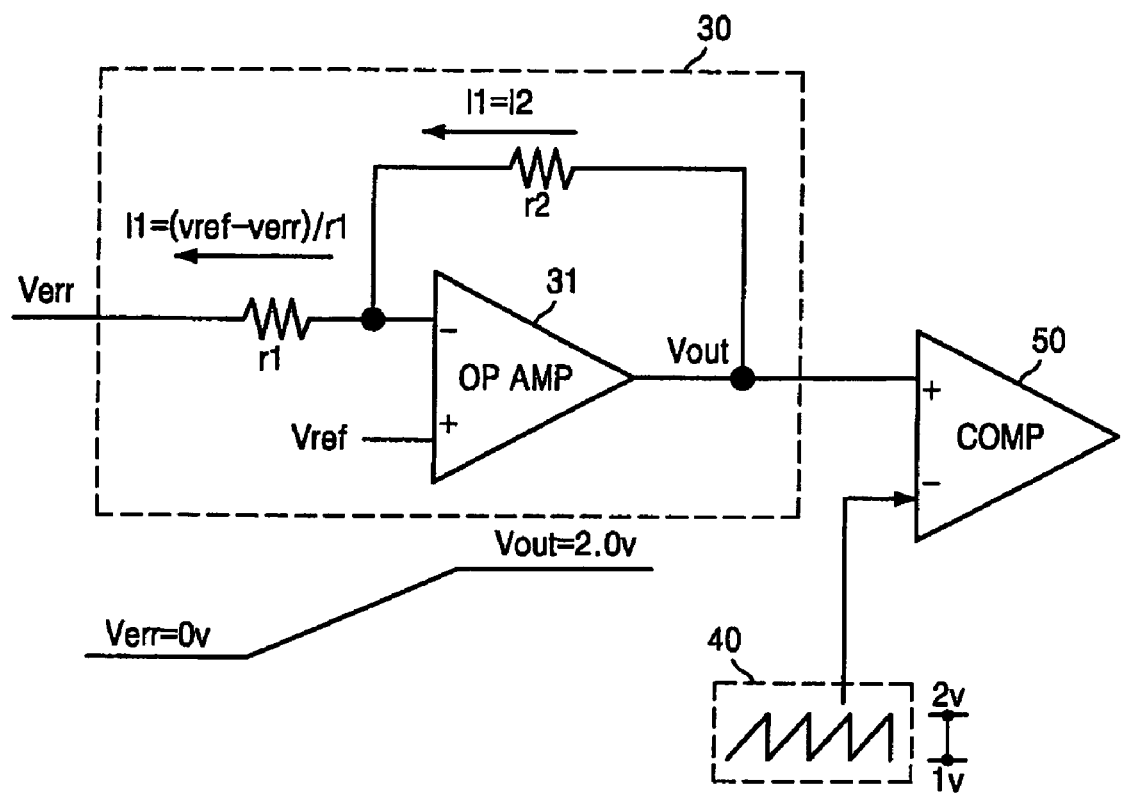
FIG. 4 is a block diagram illustrating the operation of a swing range converting unit when an output signal of an error amplifier is smaller than a reference signal.

In contrast to FIG. 3, FIG. 4 is a block diagram illustrating the operation of swing range converting unit 30 when the error signal Verr provided by error amplifier 250 is less than the second reference voltage Vref, (e.g., 1.5V).

Referring to FIGS. 2, 4, and Equation 2 below, swing range converting unit 30 will convert an error signal Verr of 0V to an adjusted error signal Vout of approximately 2.0V (or 2.0625V per equation 2).

$$Verr = 0v, \; Vref = 1.5 \qquad \text{Equation 2}$$

$$r1 = 80 \; k$$

$$r2 = 30 \; k$$

$$Vout = Vref - \frac{Verr - Vref}{r1} * r2$$

$$= 1.5 - \frac{0 - 1.5}{80 \; k} * 30 \; k$$

$$= 2.0625 \; v$$

$$i1 = (0 - 1.5)/80 \; k$$

$$= 18.75 \; uA$$

$$i1 = i2$$

Figure 5:
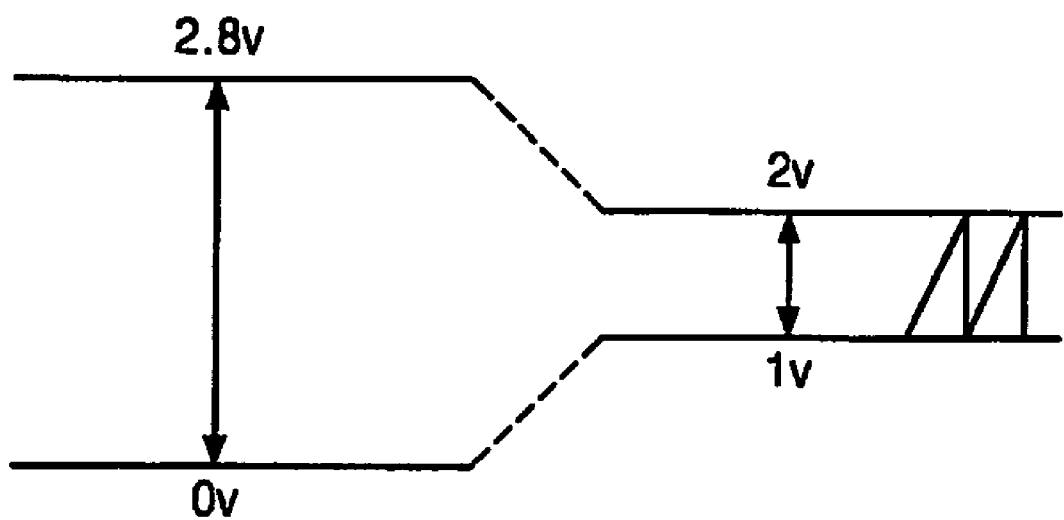
FIG. 5 is a waveform diagram of input/output signals of the swing range converting unit.

In view of the foregoing, FIG. 5 is a waveform diagram of an input/output signal provided by swing range converting unit 30. Referring to FIGS. 2 through 5, swing range converting unit 30 converts the error signal Verr, initially swinging between 0V and 2.8V, to an adjusted error voltage Vout swinging between about 1.0V and 2.0V. Accordingly, swing range converting unit 30 reduces ripple and noise associated with error signal Verr, as otherwise output from error amplifier 250. In this manner, swing range converting unit 30 decreases the probability of malfunction related to the operation of comparator 50.

Also, the adjusted error signal Vout provided by swing range converting unit 30 has almost the same swing range as the oscillation signal provided by oscillator 40. Therefore, the current draw by PMOS transistor 213 and inductor 231 may be reduced accordingly. Also, as overshoot and/or undershoot of the output voltage V0 of low pass filter 230 in signal converting apparatus 200 is reduced, the settling time for the output voltage becomes faster.

As described above, a signal converting apparatus according to an embodiment of the invention yields better agreement in the swing range of an error signal generated by an error amplifier with the swing range of an oscillation signal associated with the swing range converting unit. Accordingly, an excessive current drain may be prevented in relation to the constituent PMOS transistor and inductor of the signal converting apparatus, and since overshoot and undershoot are reduced accordingly, settling time is faster.

Although the invention has been described in the context of several embodiments, it will be appreciated by those skilled in the art that changes may be made in these embodiments without departing from the scope of the invention, as defined by the appended claims and their equivalents.

What is claimed is:

1. A signal converting apparatus comprising:
a swing range converting unit configured to compare an error signal varying across a first swing range with a first reference voltage, and convert the error signal to an adjusted error signal varying across a second swing range in accordance with the comparison of the error signal and the first reference voltage;

an oscillator configured to generate a periodic oscillation signal varying approximately across the second swing range;

a comparator configured to receive and compare the adjusted error signal and the oscillation signal, and generate a pulse-width modulated signal in accordance with the comparison;

a low pass filter having an input terminal and an output terminal;

a switching unit configured to control the supply of a direct current (DC) power voltage to the input terminal of the low pass filter in response to the pulse-width modulated signal;

a voltage divider connected between the output terminal of the low pass filter and ground and configured to provide a divided voltage output;

an error amplifier configured to receive the divided voltage output and a second reference voltage, amplify a voltage difference between the divided voltage output and the second reference voltage, and generate the error signal; and a reference voltage generation unit configured to generate the first reference voltage and the second reference voltage, wherein the first swing range is greater than the second swing range, and the second swing range is defined between the first reference voltage and the second reference voltage.

2. The signal converting apparatus of claim 1, wherein the swing range converting unit comprises:

an operational amplifier having a first input terminal receiving the error signal through a first resistor, a second input terminal receiving a reference signal, and an output terminal providing the adjusted error signal; and a second resistor connected between the first input terminal and the output terminal.

3. The signal converting apparatus of claim 1, wherein the signal converting apparatus is a DC to DC converter.

4. The signal converting apparatus of claim 1, wherein the periodic oscillation signal is a sawtooth waveform.

5. A signal converting method comprising:

generating a first reference voltage and a second reference voltage;

comparing an error signal varying across a first swing range with the first reference voltage;

converting the error signal to an adjusted error signal varying across a second swing range in accordance with the comparison of the error signal and the first reference voltage;

generating a periodic oscillation signal varying approximately across the second swing range; and receiving and comparing the adjusted error signal and the oscillation signal, and generating a pulse-width modulated signal in relation to the comparison; controlling the supply of a direct current (DC) power voltage to an input terminal of a low pass filter in response to the pulse-width modulated signal;

low-pass filtering the received DC power voltage with the low pass filter;

dividing a low-pass filtered voltage using a voltage divider to provide a divided voltage output; and receiving the divided voltage output and the second reference voltage and amplifying a voltage difference between the divided voltage output and the second reference voltage to generate the error signal, wherein the first swing range is greater than the second swing range, and the second swing range is defined between the first reference voltage and the second reference voltage.

* * * * *